United States Patent
Claussen et al.

(10) Patent No.: US 9,443,201 B2
(45) Date of Patent: Sep. 13, 2016

(54) SYSTEMS AND METHODS FOR LEARNING OF NORMAL SENSOR SIGNATURES, CONDITION MONITORING AND DIAGNOSIS

(75) Inventors: Heiko Claussen, North Brunswick, NJ (US); Justinian Rosca, West Windsor, NJ (US); Hans-Gerd Brummel, Berlin (DE); Edward David Thompson, Casselberry, FL (US)

(73) Assignee: Siemens Aktiengesellschaft, Munich (DE)

( * ) Notice: Subject to any disclaimer, the term of this patent is extended or adjusted under 35 U.S.C. 154(b) by 530 days.

(21) Appl. No.: 13/703,156

(22) PCT Filed: May 12, 2011

(86) PCT No.: PCT/US2011/036188
§ 371 (c)(1),
(2), (4) Date: May 29, 2014

(87) PCT Pub. No.: WO2011/156080
PCT Pub. Date: Dec. 15, 2011

(65) Prior Publication Data
US 2014/0324739 A1 Oct. 30, 2014

Related U.S. Application Data

(60) Provisional application No. 61/352,855, filed on Jun. 9, 2010.

(51) Int. Cl.
*G06N 99/00* (2010.01)
*G06K 9/62* (2006.01)
(52) U.S. Cl.
CPC ........... *G06N 99/005* (2013.01); *G06K 9/6284* (2013.01)

(58) Field of Classification Search
None
See application file for complete search history.

(56) References Cited

U.S. PATENT DOCUMENTS

| 3,795,916 A * | 3/1974 | Wallace | G05B 19/048 700/33 |
| 7,539,597 B2 * | 5/2009 | Wegerich | G05B 23/0254 700/108 |
| 8,356,207 B2 * | 1/2013 | Hosek | G05B 23/0235 702/184 |
| 2003/0139905 A1 * | 7/2003 | Helsper | G06F 11/3006 702/182 |
| 2010/0316293 A1 | 12/2010 | Claussen et al. | |
| 2015/0026690 A1 * | 1/2015 | Wang | G06F 11/3006 718/102 |

OTHER PUBLICATIONS

PCT International Search Report mailed Oct. 8, 2012 corresponding to PCT International Application No. PCT/US2011/036188 filed May 12, 2011 (19 pages).

(Continued)

*Primary Examiner* — Alan Chen

(57) ABSTRACT

Systems and methods to monitor a signal from an apparatus are disclosed. A feature extracted from the signal is automatically defined. Signals are received over a period of time wherein the apparatus is in a normal operational mode. Features are classified in a learning mode and are applied to create a reference model that defines a within-normal operational mode. In a testing mode a signal generated by the apparatus is received, a feature is extracted and classified. Instantaneous data generated in operational mode by the apparatus is classified by the system as abnormal if it does not lie within boundaries of the reference model or contains information/structure in an orthogonal subspace. A learned reference model is augmented by a user or automatically. In one illustrative example the apparatus is a power generation equipment and the signal is an acoustic signal.

21 Claims, 4 Drawing Sheets

(56) References Cited

OTHER PUBLICATIONS

Generalized Mutual Interdependence Analysis; Claussen, et al. In Acoustics, Speech and Signal Processing, ICASSP 2009, IEEE International Conference, Apr. 19, 2009 (pp. 3317-3320).
Mutual Interdependence Analysis (MIA); Claussen, et al. In Independent Component Analysis and Signal Separation; Lecture Notes in Computer Science, Springer Berlin Heidelberg, Sep. 9, 2007(pp. 446-453).
Chapter 10: Outlier Detection, Influential Observations, Stability, Sensitivity, and Robust Estimation of Principal Components; In I.T. Jolliffe: Principal Component Analysis, Springer-Verlag, New York, 2002 (pp. 232-268).
Feature Extraction and Classification of Gear Faults Using Principal Component Analysis; Li, et al. In Journal of Quality in Maintenance Engineering, Emerald Group Publishing Ltd, GB, vol. 9, No. 2, Jan. 1, 2003 (pp. 132-143).

\* cited by examiner

SYSTEMS AND METHODS FOR LEARNING OF NORMAL SENSOR SIGNATURES, CONDITION MONITORING AND DIAGNOSIS

CROSS REFERENCE TO RELATED APPLICATIONS

The present application claims the benefit of U.S. Provisional Patent Application Ser. No. 61/352,855 filed on Jun. 9, 2010, which is incorporated by reference herein in its entirety.

TECHNICAL FIELD

The present invention relates to systems and methods for learning, monitoring and diagnosing conditions in machines and systems.

BACKGROUND

Maintenance of operating equipment is an ongoing problem. It is a particularly challenging problem when the operating equipment performs critical functions and must be kept operating in good acceptable conditions.

One example of operating equipment that must be maintained, monitored and diagnosed is power generating equipment. There are many components of a power generating system. For example, power generating systems can include turbines, generators, boilers and transformers. They may also include related auxiliary equipment, such as pumps and drives, fans, valves, exhaust gas cleaning systems etc. Each of these components are subject to failure and must be monitored and maintained to provide adequate performance, particularly in mission critical circumstances.

Many other types of equipment are subject to the same considerations. For example, medical equipment and other industrial equipment also need to be monitored to insure proper operation.

There are many root causes for out-of-normal operational behavior of operational machinery. This makes it very difficult to exhaustively characterize the physical operation of the machinery. An exhaustive characterization of failure mechanisms of equipment is also very difficult. Thus, the monitoring and maintenance of the equipment is time consuming and expensive. It usually requires very highly trained and certified personnel. Thus, companies spend a great deal of human capital and make a large investment to monitor and maintain operating equipments. It is a constant worry for operating entities and requires constant vigilance.

Accordingly, new and improved methods, apparatus and systems are needed to improve the monitoring and maintenance of a variety of different machines and systems.

SUMMARY OF INVENTION

In accordance with an aspect of the present invention, a method to determine a status of an apparatus is provided wherein one or more sensors capture a signal generated by the apparatus to be processed by a processor in a learning mode. The processor automatically defines a feature by using the signal, wherein the feature includes a representation of a characteristic of a signal in a transform domain. The processor learns a reference model in a learning mode that defines a normal operational mode of the apparatus in a first feature space. Then signals generated by the apparatus are captured by the one or more sensors in an operational mode to extract an operational feature. The processor compares the operational feature to the reference model to determine whether the apparatus is operating in the normal operational mode. If the processor determines that the apparatus is not operating in the normal operational mode, then the processor analyzes the signal in one or more second feature spaces to determine whether there are additional features that define the normal operational mode.

In accordance with an aspect of the present invention, the second feature space is orthogonal to the first feature space.

In accordance with an aspect of the present invention, the additional features are added to the reference model if it is determined that the additional features define the normal operational mode.

In accordance with a further aspect of the present invention, the analysis of the signal in the second feature space is performed by the processor with principal component analysis, independent component analysis or mutual interdependence analysis.

The representation of the characteristic can be selected from the group consisting of a maximum amplitude, an average amplitude, an energy content, independent components, principal components, a crest factor, a deviation from an average, a kurtosis, and a skew all determined over a period of time in the transform domain.

In accordance with another aspect of the present invention, the learning mode is in effect until the sensor data information for normal mode of operation is extensively captured.

In accordance with a further aspect of the present invention, the processor determines that an out-of-normal status of the feature does not generate an alert.

The one or more sensors collect and capture different types of signals selected from the group consisting of acoustic signals, electromagnetic signals, temperature signals, pressure signals; vibration signals and combinations thereof.

The apparatus can be any type of apparatus, including but not limited to a power apparatus.

The method can further include classifying an operational feature extracted from a signal generated by a second apparatus. The method can also include relaxing a boundary of the reference model automatically.

In accordance with another aspect of the present invention, a method is provided to determine a status of an apparatus where a reference model has been learned in a first feature space that defines a normal mode of operation. The method includes the steps of capturing a signal generated by the apparatus by one or more sensors in an operational mode to extract an operational feature and then comparing the operational feature to the reference model with a processor to determine whether the apparatus is operating in the normal mode of operational and, if not, then analyzing the signal in a second feature space that is different from the first feature space to determine whether there are additional features that define the normal operational mode. In accordance with an aspect of the present invention, the second feature space and the first feature space are orthogonal.

The present invention also contemplates a system to achieve the methods set forth above and described herein. The system includes apparatus that operates in a normal mode of operation, one or more sensors that capture signals while the apparatus is in an operating mode, memory that stores a reference model that defines a normal mode of operation in a first feature space and a processor connected to the one or more sensors and to the memory. The processor extracts an operational feature from capture signals and determines accesses the reference model to determine whether the apparatus is operating in the normal mode of operational and, if not, then analyzes the captures signals in a second feature space that is orthogonal to the first feature space to determine whether there are additional features that define the normal mode of operation.

In accordance with further aspects of the invention, the processor adds the additional features to the reference model if it is determined that the additional features define the normal mode of operational. Further, the processor performs the analysis of the signal in the second feature space with principal component analysis, independent component analysis or mutual interdependence analysis.

The features in the first feature space and the second feature space are selected from the group consisting of a maximum amplitude, an average amplitude, an energy content, an energy content in a selected frequency band, independent components, principal components, a crest factor, a deviation from an average, a kurtosis, and a skew all determined over a period of time in the transform domain.

DETAILED DESCRIPTION

An aspect of the present invention includes monitoring and diagnosis of power equipment. Power generation main components (e.g., turbines, generators, boilers, transformers) as well as related auxiliary equipment (such as pumps and drives, fans, valves, exhaust gas cleaning systems etc.) have operational issues that are normally characterized by changes in their acoustic signatures in sub-sonic, sonic and ultrasonic ranges, (e.g., arcing, bearing or lubrication issues, loose parts, teaks, etc.). As stated earlier, there are many root causes for out-of-normal operational behavior, which makes it very difficult to specify the sound changes upfront. In many cases of failure the related characteristic sound patterns are also not known. Moreover, an exhaustive physical characterization is very difficult if not impossible. Useful requirements for a multi-purpose acoustic analysis or diagnostics system are the applicability to the monitoring and diagnosis of all kind of equipment, automatic operation and analysis, including giving warnings when an out of normal operation mode comes up. An additional requirement is that a monitoring system should be enabled to be operated by not highly trained personnel (no acoustic analysis knowledge should be necessary). Furthermore, the system in one embodiment of the present invention is installed and put into operation easily. This is a desirable aspect, as a system in one embodiment of the present invention should be applied to a variety of equipment in a consecutive periodic manner.

Solution Principle

Figure 1:
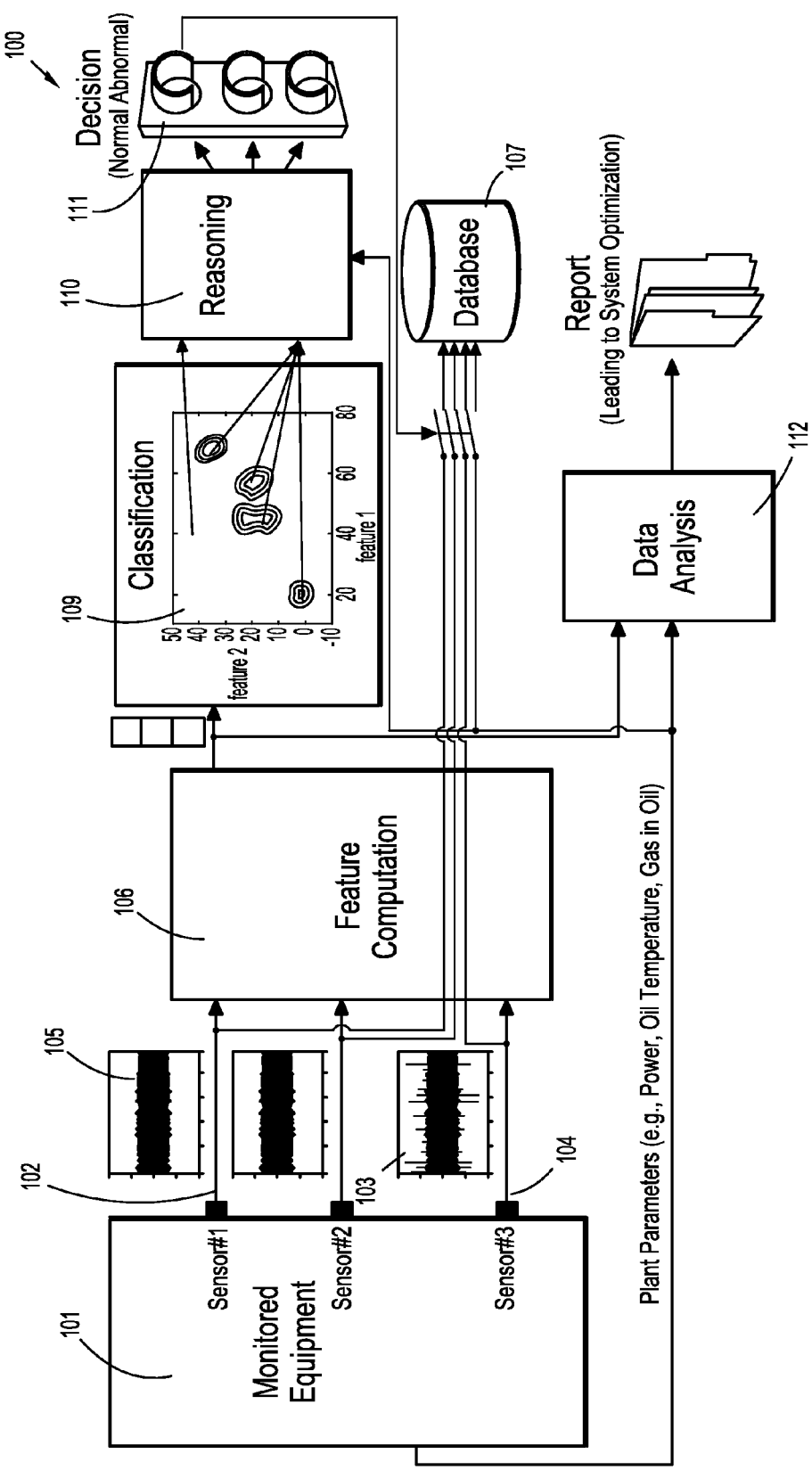
FIG. 1 illustrates a system in accordance with an aspect of the present invention.

Taking into account the general requirements above, one goal of a system provided herein in accordance with an aspect of the present invention is to capture and analyze, for example, acoustic emission data which is in a subsonic and/or sonic and/or ultrasonic range, of power equipment preferably in real-time or substantially in real-time and to automatically detect out-of-normal operation before major problems arise. This automation in analysis of acoustic signatures, which is one aspect of the present invention, enables the system employment without requiring specially trained staff or expert knowledge. The system output, in one embodiment of the present invention, is a signal such as a virtual signal light that shows if and where action is required. An overview of a signal monitoring setup 100 for instance acoustic emission is exemplified in FIG. 1 and will be further explained below.

A system 100 has at least one sensor 102 attached or close to a machine or device 101. A plurality of sensors may be provided, such as sensors 103 and 104. Sensors capture and convey, for example, acoustical or vibrational signals generated by the equipment 101. They may also collect temperature, pressure and other types of signals. In typical instantiation, the range of a sensor is sub-sonic and/or sonic and/or supersonic. A vibration amplitude diagram over a time period is illustrated as 105. The sensors pick up an acoustical or vibrational signal and generate an electrical signal or any other signal that can be processed by a processor 106. The novelty of raw signals is evaluated in short time intervals using feature extraction/computation and classification. Feature computation is performed by the processor 106. The features are representations/cues of physically motivated data characteristics in a particular transform domain e.g., Fourier domain, wavelet domain, kernel space, etc. Possible features include, for example, kurtosis, skew, crest factor, band/wavelet energies, independent components, principal components, etc. Steps to compute features from a time variant signal or representation in a transform domain are known in the state-of-the-art and are not further explained herein.

One illustrative example of a feature is energy in a particular frequency band during a certain time interval. A feature can be classified in pre-defined features, for instance an energy in a band from 0-50 kHz, from 50-100 kHz, 100 kHz-150 kHz, 150-200 kHz. In a sonic range a feature may include predefined frequency bands of 50-100 Hz, 1000 Hz-1500 Hz, 10 kHz-11 kHz. A feature can also be defined as a crest factor, standard deviation, skewness, kurtosis or any other descriptive property of a signal, preferable in a transform domain.

In one embodiment of the present invention, the features are data dependent features. It is not known before data is analyzed what significant data properties are that define a useable feature. The system as provided herein determines what a meaningful feature is. The system thereto is programmed to analyze the data and to determine what a meaningful feature is. For instance, using the earlier example, a system may analyze a complete frequency spectrum to determine in which frequency bands there is a significant energy content.

In one embodiment of the present invention a data dependent feature is extracted from a recorded signal for instance from an acoustic signal that can be subsonic, sonic or ultrasonic or a combination of two or more thereof, by using principal component analysis or independent component analysis. In another embodiment of the present invention, a feature is extracted by a mutual interdependence analysis (MIA) as disclosed in U.S. patent application Ser. No. 12/614,625 filed on Nov. 9, 2009 which is incorporated herein by reference. MIA, as disclosed in U.S. patent application Ser. No. 12/614,625, enables feature extraction, dimensionality reduction, classification and novelty detection.

One step in automatically selecting a feature in one embodiment of the present invention includes also selecting meaningful features. A meaningful feature can be selected, for instance, to represent most of the signal energies (e.g., largest x number of principal components that jointly explain 90% of the signal energy), by applying predefined thresholds (e.g., use the crest factor if it exceeds values x, or varies more than x in the training, data) or automatic feature compression methods (e.g., boosting, independent components of features with highest energy). Automatic selection of important features is accomplished, for example, by principal component analysis. Further, independent component analysis or mutual interdependence analysis can also be used. The incoming data is processed using these known analysis techniques and the important features or structures within the data are identified and selected as the features to monitor. Thus, as set forth above, if 90% of the energy is accounted for in one or more frequency bands, then those frequency bands would be automatically selected as a feature to be monitored.

One aspect of the present invention is the learning of features related to equipment 101 by the system 100. A database 107 and a related storage medium such as a memory or a hard-drive or the like that is enabled to store data and to retrieve data, including raw sensor data and processed data, is provided as an aspect of the present invention. A processor, such as processor 106, is enabled to write data to the database and to retrieve data from the database.

In one embodiment of the present invention a signal generated by a plurality of sensors during a period of time is received by 106 and is processed to extract predefined and data dependent features.

Data analysis takes place in a module 112. In this module, data that may be unusual and stored for later analysis can be analyzed using any number of techniques.

During a training phase, operating conditions of the monitored equipment 101 may change or may be changed deliberately. For instance, oil temperature for lubrication and cooling of the equipment may gradually increase from initial start to fully stable operational mode. During that period the features from signals generated by the sensors are recorded. Furthermore, there are different stable operational conditions. For instance, the temperature in a gas turbine may fluctuate, the load on a power generator may fluctuate, the composition of fuel provided to a generator may fluctuate. All these fluctuating operational conditions may influence the acoustic or vibrational features of the equipment. During a training phase or training mode the features are recorded over an as wide as possible normal operational range.

In one embodiment of the present invention signals, such as acoustic signals, presented as an extracted operational feature to a system provide an indication of a possibility of equipment failure, while normal operational parameters do not indicate or do not yet indicate a troublesome operational situation. Especially operational features that have not been extracted and recorded during a training mode, may indicate that the equipment is not operating optimally or that a failure is about to take place on short or longer term. In general, one cannot train a system to learn all failure modes. However, in accordance with an aspect of the present invention a system is trained to learn normal operational conditions and to provide an alert when the equipment appears to be operating outside normal conditions, while standard operational parameters, such as pressure, load performance, temperature and the like, appear to be normal.

In one embodiment of the present invention, features are classified by a processor in a step or a module 109. For instance, a cluster diagram may be generated that displays the dependency or correlation of two features of the monitored equipment within normal operating mode. As an example a two-dimensional classification is shown in 109. It is to be understood that higher dimensional classification of 3 or more features are possible and are fully contemplated. A classification diagram may thus show at least one or may show a plurality of clusters that determine a normal operational mode. By calculating a feature in an operational mode and comparing it to a classification determined in a training mode, a system may decide that the feature determined from sensor data is in an out-of-normal range. As a result, an alert 111, for instance in a traffic light mode "normal", "abnormal" and "uncertain" is generated to a receiver.

On-line diagnosis based on novelty detection and on-line learning for large scale problems, when it is unfeasible to keep around all data, is disclosed in U.S. Provisional Patent Application Ser. No. 61/350,953 filed on Jun. 3, 2010, which in incorporated herein by reference. For example, a novelty detection system can use multi-channel sensor data at rates of one million samples per second. One-class classification is a feasible approach if one can learn the behavior of the system in normal modes of operation over longer periods of time, such as one month. Out-of-normal regimes of operation are usually hard to record or model. The requirement to have a novelty (one-class) classification machinery at any point in time that adapts rapidly to the current regime of operation is disclosed in U.S. Provisional Patent Application Ser. No. 61/350,953. The classification step 109 in one embodiment of the present invention is preformed in accordance with a method and/or an apparatus as provided in the above provisional patent application.

Features that have been learned from the signals generated by equipment or by a system thus form a signature of the system or the equipment which in one embodiment of the present invention defines a normal operation mode of the equipment or the system. In one embodiment of the present invention, a signature of a system or equipment based on extracted features is learned within 24 hours of operation time of the equipment. In another embodiment of the present invention, a signature of equipment is learned in a time period longer than 24 hours but shorter than 5 days of operation time of the equipment from features extracted from a signal generated by the equipment. The amount of time spent learning is dependent on the system being monitored. Large and complex equipment, like a power generating turbine, emits many different acoustic signals depending on its operational state. These signals may depend on the time of day, on quality of fuel on power demand, seasonal changes and the like. It is conceivable that acoustic signals have to be captured during at least months of operation to define a meaningful signature for such equipment.

The decision by the processor 106 that the data is out-of-normal is transmitted to an authority, to a system or to an operator or plant personnel who can take action in response to an alert. In a further embodiment of the present invention, only navel data or time distant samples are stored in the database limiting its size but enabling feature trend analysis. Measured or set plant or equipment parameters are also recorded. Features and set or measured plant or equipment parameters in one embodiment of the present invention are correlated and analyzed.

In one embodiment of the present invention a certain classification point or area is associated with an optimized operation of the monitored equipment. An operator can use a report of an actual feature classification 112 to manually optimize the settings of the equipment. In a further embodiment of the present invention, an equipment control system that controls operational parameter settings of the equipment uses the classification data to tune or optimize, possibly iteratively, the parameter settings of the equipment.

Figure 4:
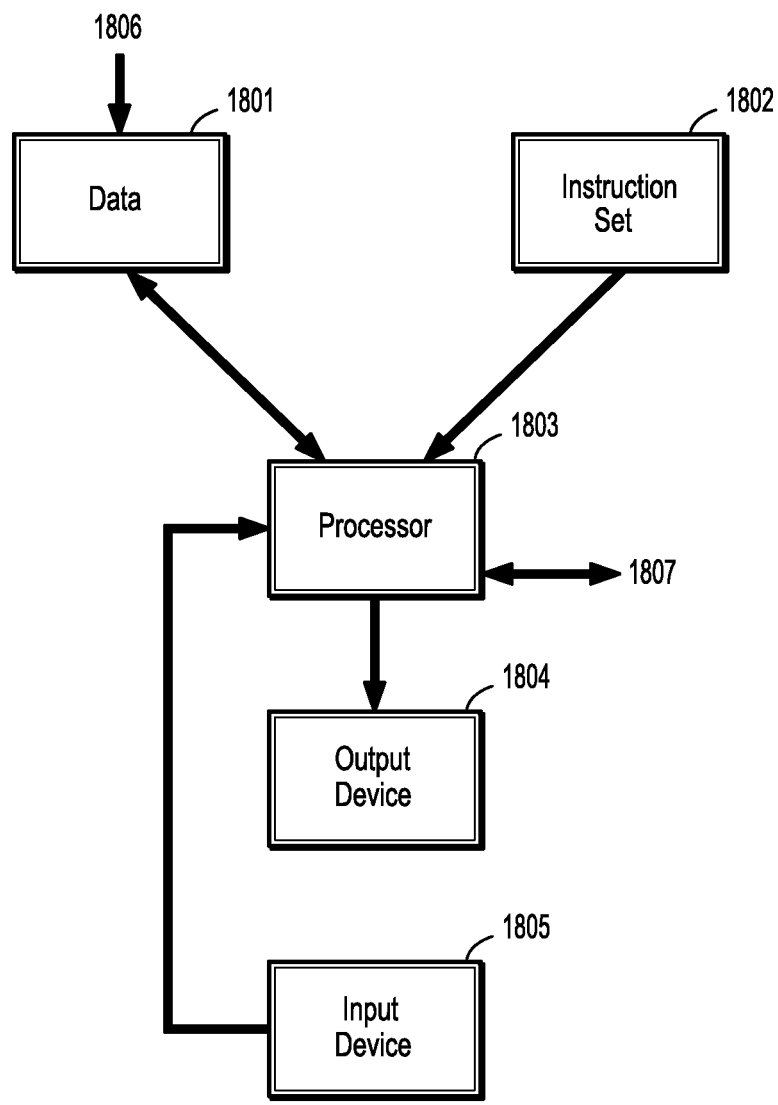
FIG. 4 illustrates a system in accordance with an aspect of the present invention.

A typical instantiation of the system architecture is presented in FIG. 4 which provides a block diagram of a typical instantiation of the system architecture for learning of normal sensor signatures, condition monitoring and diagnosis.

Figure 2:
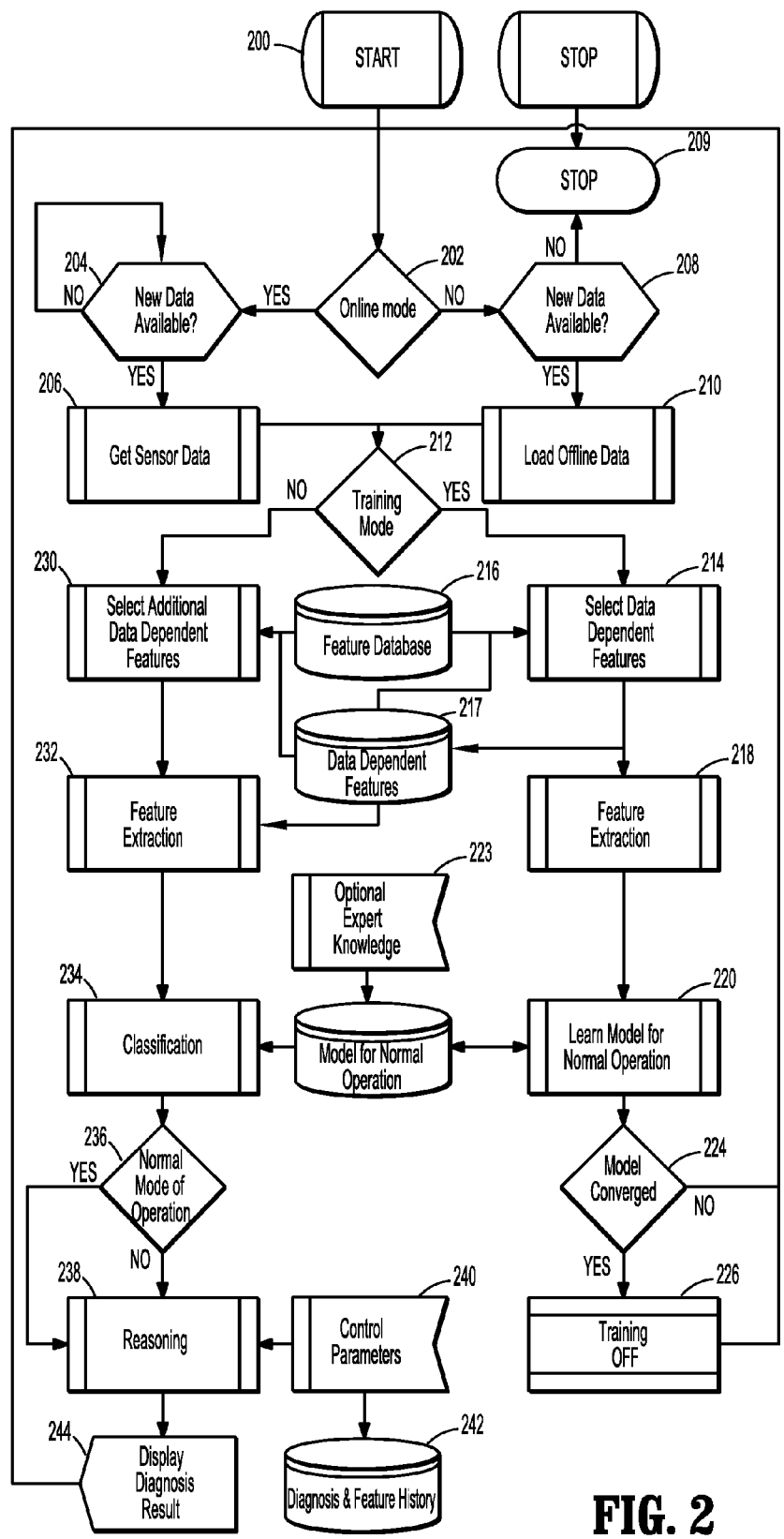
FIG. 2 illustrates a method in accordance with an aspect of the present invention.

Referring to FIG. 2, the process starts in step 200. In step 202, the processor determines whether the system of the present invention is operating in the online mode. If it is, then in step 204, the processor determines whether new data is available. If there is no new data available, the processor loops until new data is available. When new data is available, then in step 206, the processor obtains the new sensor data.

If the system of the present invention is not operating in on online mode, then in step 208, the processor determines whether there is any new data available. If there is no new data, then in step 209, the processor stops processing. If there is new data available, then in step 210, the processor loads then offline data.

Then in step 212, the processor determines whether the system of the present invention is operating in a training mode. If it is, then in step 214, the processor selects the data dependent features. The processor performs this step in the manner previously described. In selecting the data dependent features, the processor accesses the feature database 216. After the processor has selected the data dependent features, in step 218, the processor extracts the relevant features. The processor performs this step in the manner previously described.

Then, in step 220, the processor learns the model for normal operation. The processor performs this step in the manner previously described. During this step, the processor accesses a model for normal operation and can also access a database of optional expert knowledge 223.

In step 224, the processor determines whether the model has converged, if there is no convergence, then the processor repeats these steps. If there is convergence, then the processor turns the training mode off in step 226.

Going back to step 212, if the processor determines that the system of the present invention is not operating in a training mode, then the processor performs step 230. In step 230, the processor selects additional data dependant features white referring to the feature database 216 and the data dependant features 217.

This step can be performed regardless of the analysis of the feature database which includes a first feature space. Such an approach is computationally unwieldy. It is therefore preferred to analyze a second feature space and to select additional data dependant features if a decision criteria is met. The decision criteria can be whether a predetermined threshold amount of energy is accounted for in the first feature space. The decision criteria can also be based on whether a predetermined threshold amount of energy is accounted for in another feature space. The thresholds can be empirically determined, and will depend on whether the first feature space or the second feature space is being considered as well as the type of system being monitored. Alternatively, the decision criteria can be whether the apparatus is operating in the normal operational mode.

Then, in step 232, the processor performs feature extraction. Then, in step 234, the processor performs classification. In step 236, the processor determines whether the system is in a normal mode of operation. Then the processor performs a reasoning function in step 238 using control parameters established in step 240. In this step, the processor determines whether the machine being operated is operating properly or not or whether the machine is operating in a questionable manner. The processor maintains the operational history of the machine in the database in step 242 and alerts those monitoring the machine as to the operational status in step 244.

Due to the unknown specification of most out-of-normal acoustic effects, the system has to learn the normal sound emission mode using statistical processing of the recorded data (training mode). As a first step, the system automatically defines a set of features that describe the statistical properties of the monitored equipment. The features are representations/cues of physically motivated data characteristics in a particular transform domain e.g., Fourier domain, wavelet domain, kernel space etc. Possible features include for example kurtosis, skew, crest factor, band energies, principal components, independent components etc. The features, which are defined during the learning phase, are fixed after the sensor data information for normal mode of operation is extensively captured. During testing, additional features are dynamically found and selected that sparsely represent the remaining information or energy, of the current data instance, in subspaces orthogonal to the ones given by the fixed features from the learning phase. This flexible/dynamic feature selection enables a better representation of new unseen data and thus improves the classification performance.

For example, assume that the input of the system is of high dimensionality D=1000 and the learning phase showed that the normal mode of operation is well captured by features in the first 5 principal component directions. The remaining 995 principal component directions do not capture important information about the normal state. However, as there is no or only limited out-of-normal data available for training, these directions are also not optimized to detect features of out-of-normal operation in new data. That is, one cannot reliably detect out-of-normal instances by modeling features in these 995 principal component directions as the energy from out-of-normal data can disperse over the many dimensions. Also it is clear that testing in the small subspace of the data that was found to represent normal operation cannot capture all possible out-of-normal data either. Therefore, one embodiment of the present invention does not only verify the normality in the space that represents normal operation but also searches and analyses the data in the remaining dimensions. A principal component analysis of the test data is performed in the 995 dimensional space that is orthogonal to the initially found principal components. This step is performed, for example, in step 230 shown in FIG. 2. This can be used to cancel the dispersion of a signal over the dimensions. Out-of-normal operation is inferred if the new principal components capture structure in the data where no structure was found in the normal mode training data. Principal component analysis uses the energy and its difference between dimensions as indicator for structure in the data. That is, e.g., if the energy of the first principal component or the difference between the energies of the first and second principal component is larger than a threshold it is assumed that there exists structure in the data. A similar approach to the discussed principal component analysis based example is taken for the other predefined transform domains and features.

When the feature set is found that best represents the training data, a model is computed, or learned, from sensor data that represents the emissions of an instance of equipment for all normal modes of operation. After learning converges and no additional modes of operations are observed or employed, the system fixes the learned data representation as a reference model. This learned model is given by boundaries in a multi dimensional feature space which encloses the observed normal modes of operation of the monitored equipment. At any dine, the boundaries of the model can be further augmented e.g., to enable the incorporation of expert knowledge. That is, if a certain type of false alarms occurs repeatedly or some mode of operations was not contained in the training set, the boundaries can be relaxed manually by the expert or automatically to incorporate this previously unknown scenario. During testing, an instantaneous data point is considered from normal mode of operation if its feature representation lies inside the boundaries of the reference model. Abnormal emissions are reported if the feature representation of an instantaneous data point is found outside the boundaries of the reference model. All training and testing can be performed online (in real-time) or offline.

The unsupervised learning principle of this system for monitoring normal modes of equipment operation is independent of the monitored equipment type. Thus, it can be used for a multitude of equipments and employ various sensor types without requiring modifications in the method. However, for optimal performance, the feature selection possibly has to be repeated if different types of equipment are monitored. If the instances of monitored equipment are of the same build, the statistical knowledge that is captured in the reference model is transferable, thus enabling repeated evaluation of emissions of different instances of equipment at periodic intervals, without the need to retrain a monitoring system. If only one instance of equipment is monitored, the monitoring system optimizes its performance to this device. It is expected that acoustic emissions differ between units due to variations in the build and installation environment. The adaptation results in higher reliability and accuracy of the detection of out-of-normal operation.

Similarities to acoustic emissions from units of the same build are used to aid the learning process such as providing a priori knowledge of unseen operational modes. Multiple models can be used to capture different aspects of normal equipment operation e.g., a model for the family of the equipment over its lifetime or a model of the particular instance of equipment for a period of time.

After the reference model is found, and no substantial convergence takes place, the system in one embodiment of the present invention automatically switches to the monitoring mode, where misfits to the learned reference model are detected and it is reported if unexpected modes have been found in the input data during the analysis. In one embodiment of the present invention a system is provided that is enabled to detect faulty machine behavior and ageing effects already in their infancy stage and with higher sensitivity compared to other existing methods. Hence, the results of this approach indicates an optimal timing for a service interval or allow even a delayed emergency shut down just in time prior to major consequential damage. New instantaneous data are classified online (in real-time) or offline as normal or out-of normal operation. That is, as discussed above, if the feature representation of the new instance lies inside the multi dimensional boundary of the reference model, the data is classified as normal mode of operation. Otherwise, out-of-normal operation is assumed. If out-of-normal data is detected, the instantaneous raw data point, that represents this abnormal information, is stored for later analysis and learning. Also a selection of data points from instantaneous normal modes of operation is periodically stored to enable trend analysis of the emissions e.g., in a post processing step.

In a final stage, the system uses the classification information over time in a reasoning module 110, optionally in combination with control parameters that define the current regime of operation of the equipment. This approach improves the robustness of the classification and enables the diagnosis of the possible causes for the out-of-normal operation and their criticality. The result of the reasoning module is displayed in a simple traffic light mode that abstractly captures severity, number of occurrence of a particular fault etc. in a failure mode and effect analysis (FMEA) fashion. This presentation of the monitoring results is easy to understand by non experts and enables simple and fast decisions on further actions e.g., scheduling of maintenance in the next outage, additional monitoring with specialized equipment, emergency stop of the machine etc.

The classification module 109 is responsible for the decision if an input is outside of the boundaries of normal operation. A reasoning module 110 in one embodiment of the present invention is also included. The reasoning module 110 in one exemplary embodiment of the present invention assigns a normal mode of operation to an input that was classified as out-of-normal if for instance an abnormal operation only occurred for a short period of time, the certainty of abnormal operation is low (to prevent the operator to be swamped with many false alarms), the machine parameters indicate that the machine is in a save mode (e.g., offline) etc.

When large and complex systems such as power equipment are monitored it is generally not feasible to record abnormal data. Also, it is not possible to capture all possible error scenarios due to the complexity of the large machineries.

In one embodiment of the present invention a reasoning or classification module is provided that is trained on classified errors that occurred over a long time on a fleet of devices to diagnose the error, allow an estimate of its severity, propose next steps (immediate shutdown, run on low load etc.) or the fastest way to repair the machine. However, this is very difficult due to the large number of possible errors, low failure rates and year by year introduction of new machine designs. Thus, in another embodiment of the present invention, the reasoning, module 110 applies one or more rules that evaluates an occurrence of an out-of-normal mode feature to decide if such an occurrence may be ignored (for instance happens only once and lasts a very short time) or should trigger a warning to be transmitted to a target such as a system or an operator.

System Implementation

To enable a broad application of this system in the field, a practical realization should be robust to rough environmental conditions. That is, weather proof design for outdoor monitoring, shielding against radiation or electric and magnetic fields, temperature control etc. Furthermore, the system can be connected to available diagnosis systems. Thus, it leverages available infrastructure, tools, datacenters etc. Moreover, the system can be operated remotely e.g., via a mobile network, the Internet, GSM, Wi-Fi, LAN or via any other network that can connect the system remotely with sensors at an apparatus or equipment. This feature enables that the software of a whole fleet of devices can be easily updated and that the fleet can be managed from a centralized monitoring center without additional need for infrastructure such as cabling in the field. Finally, the system and data can be analyzed remotely by an expert without the necessity for expensive and lengthy trips.

The evaluation of the current mode of operation based on previously recorded data requires in one embodiment of the present invention the following signal properties. First, the computed features have to reflect the changes in operational mode. As there is no out-of-normal data available for training, it is assumed that the normal mode acoustic emissions are correlated with physical equipment properties such as e.g., power, rotation speed, pressures etc. Material stress resulting from e.g., bearing damage will create additional acoustic emissions that are not or differently correlated to the physical equipment properties. Second, this monitoring model holds if the acoustic emission features are stable and thus predictable over long durations of time. Third, the monitored machine during training in one embodiment of the present invention is in normal mode of operation.

A system as provided herein that requires receiving, processing and generating data as an aspect of the present invention is illustrated in FIG. 4. The system is provided with data that can be stored on a memory 1801 which can be data obtained from a sensor. Data may be provided on an input 1806. An instruction set or program executing the methods of the present invention is stored on a memory 1802 and is provided to the processor 1803, which executes the instructions of 1802 to process the data from 1801. Data, such as an alert or any other signal resulting from the processor can be outputted on an output device 1804, which may be a display to display data or a loudspeaker to provide an acoustic signal. The processor also has a communication channel 1807 to receive external data from a communication device and to transmit data to an external device. The system in one embodiment of the present invention has an input device 1805, which may be a keyboard, a mouse or any other device that can generate data to be provided to processor 1803. The processor can be dedicated hardware. However, the processor can also be a CPU or any other computing device that can execute the instructions of 1802. Accordingly, the system as illustrated in FIG. 4 provides a system for data processing resulting from a sensor and apparatus as provided herein and is enabled to execute the steps of the methods as provided herein as an aspect of the present invention.

Thus, a system and methods have been described that learn (a model of) statistical knowledge about the operation of an instance of equipment (for instance power generating equipment) from a training set of sensor data and apply the learned knowledge (model) for diagnosis (normal/abnormal) of the mode of operation given by test set of data, comprising the following modules which are implemented on the system:
a. a module that automatically defines a set of features to describe the statistical properties of the equipment extracted from sensor data;
b. a module to compute, or learn, a model of the normal mode of operation from online recorded signal emissions for instance from acoustic emissions of an instance of equipment for all normal modes of operation possible;
c. a module to classify new instantaneous data as normal or abnormal, with reference to the learned model;
d. a module to reason about instantaneous classifications over a time period to output a normal/abnormal indicator for the regime of operation of the equipment; and
e. an interface to augment the learned model manually based on user input or automatically from new data.

The system can operate such that:
a. Training, data can be processed online, real-time, or offline;
b. Test data can be processed online, real-time, or offline;
c. Statistical knowledge is stored as a model that IS transferable to other instances of equipment of similar type; and
d. Multiple models can be used, such as model for the family of equipment over its lifetime, model of the particular instance of equipment for a period of time, etc.

Figure 3:
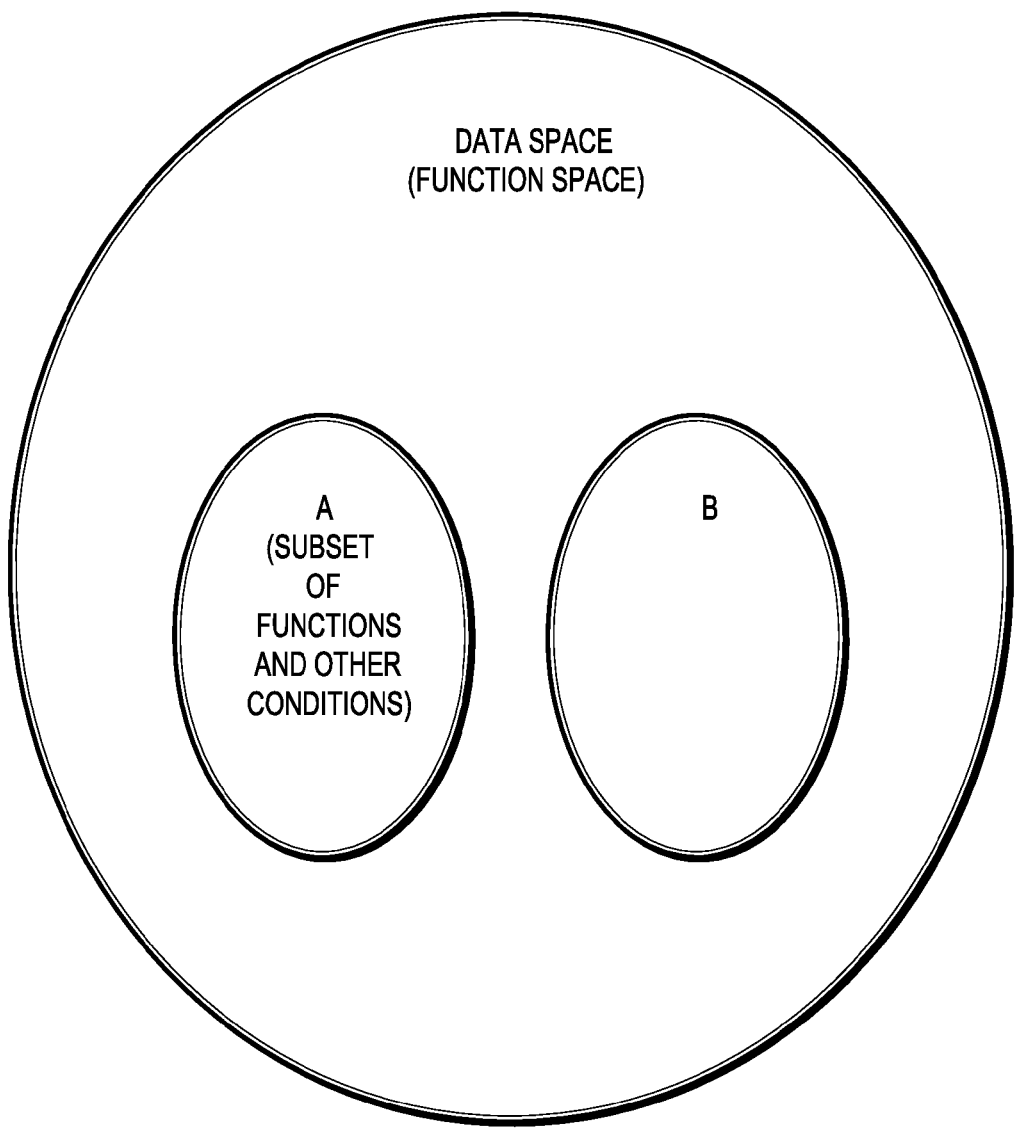
FIG. 3 illustrates a data space that includes a learned space of features defining a normal mode of operation and an additional space that may also define normal mode of operation.

The system automatically defines the set of features from two types of possible features, as represented in FIG. 3:
a. Features to extensively capture information in all normal modes of operation of the equipment in one transform domain. Multiple subsets of this type can be used, each for a different transform domain, e.g. Fourier domain, wavelet domain, kernel space, etc. These features are defined during learning phase and fixed thereafter; and
b. Features to sparsely capture remaining information or energy in subspaces other than the ones given by the fixed features (from the learning phase). These are selected dynamically to represent information in orthogonal spaces as compared to the fixed features.

Learning: After learning converges and no new normal mode emissions are observed or are employed anymore, the method fixes a learned reference model. This model is given by boundaries, in a multi dimensional feature space, which enclose the normal operation states of the equipment under test. Thereafter, the model can be used for online testing, or can be further augmented. During online testing, an instantaneous data point within these boundaries is normal, otherwise it is considered abnormal. Abnormal acoustic emissions are reported if analysis results are found outside the boundaries in the feature space.

Classify new instantaneous data as normal or abnormal, with reference to the learned model, for instance by a user.

Reason about instantaneous classifications over a time period to output a normal/abnormal indicator for the regime of operation of the equipment.

Augment the learned model manually based on user input or automatically from new data:
a. Store instantaneous data points that represent instantaneously abnormal information for later analysis and learning; and
b. Store a selection of data points from instantaneous normal modes of operation periodically to enable trend analysis.

User interface:
a. Results are reported in Traffic Light Mode which is easy to understand by non experts.

Multi-Purpose Monitoring System

The monitoring system as provided herein is applicable to all kind of equipment and different type of systems, not only to power generating equipment, but any mechanical system that produces acoustic signals during operation. Furthermore, the system and methods provided herein can be adapted to process other than acoustic signals. For instance the "normal/abnormal" mode of operation of a communication network can be monitored by a system and methods as provided herein by extracting features from received wireless signals.

In an illustrative example the monitoring signals are generated by equipment, for instance by power generating equipment. Monitoring of signals generated by another type of equipment or by a system is also contemplated. In one illustrative example generated signals are acoustic signals. The use of other types of signals is also fully contemplated. For instance, one can use available plant parameters, time and date (to indicate e.g., when a high load/stress is common), ultrasound (to monitor material stress), subsonic vibration sensors, microphone arrays (for non contact monitoring), heat sensitive cameras or sensors t) detect leaks, failing of cooling systems, insulation damage), gas sensors, radio sensors (wireless sensors radiation meters and the like to monitor systems including a power generating system, a telecommunication system and a patient healthcare system or a security system.

For instance, one application is the monitoring of patients in the medical field (e.g., coma patients that cannot notify anyone, patients in remote locations or that are mobile). Furthermore, the discussed approach can be used for surveillance e.g., of malls or businesses at night. Sensors are mounted throughout the building (such as microphones, movement detectors, video cameras) and normal operation such as a starting ventilator or a guard walking his rounds are learned. Such a system includes specific features such as glass breaking, footsteps at locations that are not on the route of the guard or running to detect intruders. The examples of the patient healthcare monitoring and the security system are examples of a surveillance system of which the operational purpose is security or surveillance rather than a correct operation of an apparatus.

Implementation related aspects:

a. The system in one embodiment of the present invention is weather proof conditioned for outdoor design to enable continued long term monitoring of outdoor equipment.

b. The system can be connected to other diagnostic systems and tools leveraging available infrastructure, tools, datacenters etc.

c. Remote operation of the system (e.g., via GSM, Wi-Fi, LAN etc.) enables online system upgrades, specialist analysis and a connection to a centralized monitoring center without the need of new infrastructure (e.g., cabling) in the field.

The unsupervised learning principle of the acoustic emissions for normal modes of equipment operation is independent of the monitored equipment type. The system and methods can be used to monitor a multitude of equipments and employ various sensor types without requiring modifications in the method, possibly requiring changes in the features. For a given type of equipment, the system can be used for acoustic analysis of emissions repeatedly, at periodic intervals, without need to retrain.

The system and method optimizes its condition monitoring performance for each individual monitored device. It is expected that acoustic emissions differ between units due to variations in the build and installation environment. The adaptation results in higher reliability and accuracy of the detection of out-of-normal operation.

In one embodiment of the present invention similarities to acoustic emissions from units of the same build are used to aid the learning process such as providing a priori knowledge of unseen operational modes.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method to determine a status of an apparatus, the method comprising:
    capturing by one or more sensors a first signal generated by the apparatus to be processed by a processor in a learning mode;
    the processor automatically defining a feature by using the first signal, wherein the feature includes a representation of a characteristic of the first signal in a transform domain;
    the processor learning a reference model in a learning mode that defines a normal operational mode of the apparatus in a first feature space;
    capturing a second signal generated by the apparatus by the one or more sensors in an operational mode to extract an operational feature; and
    comparing the operational feature to the reference model to determine whether the apparatus is operating in the normal operational mode and when a decision criteria is met, then analyzing the captured second signal in a second feature space that is different from the first feature space to determine whether there are additional features that define the normal operational mode.

2. The method of claim 1, wherein the decision criteria is whether a predetermined threshold amount of energy is accounted for in the second feature space.

3. The method of claim 1, wherein the decision criteria is whether the apparatus is operating in the normal operational mode.

4. The method of claim 1, further comprising adding the additional features to the reference model when it is determined that the additional features define the normal operational mode.

5. The method of claim 1, wherein the analysis of the second signal in the second feature space is performed with principal component analysis, independent component analysis or mutual interdependence analysis.

6. The method of claim 1, wherein the step of automatically determining a feature is performed with principal component analysis, independent component analysis or mutual interdependence analysis.

7. The method of claim 1, wherein the representation of the characteristic is one of the group consisting of a maximum amplitude, an average amplitude, an energy content, independent components, principal components, a crest factor, a deviation from an average, a kurtosis, and a skew all determined over a period of time in the transform domain.

8. The method of claim 1, wherein the second feature space is orthogonal to the first feature space.

9. The method of claim 1, wherein the first and second signals are acoustic signals and the apparatus is a power apparatus.

10. The method of claim 1, further comprising: classifying an operational feature extracted from a signal generated by a second apparatus.

11. The method of claim 10, further comprising: relaxing a boundary of the reference model automatically.

12. The method of claim 1 wherein defining the feature comprises selecting a first sub-set of content of the captured signal representing normal operation as the feature and not selecting a second sub-set of content of the captured signal not representing normal operation as indicated by a lack of structure, and wherein analyzing comprises analyzing the second sub-set of the content of the captured second signal for the structure where the structure indicates out-of-normal operation.

13. A method to determine a status of an apparatus where a reference model has been learned in a first feature space that defines a normal mode of operation, the method comprising:
 capturing a signal generated by the apparatus by one or more sensors in an operational mode to extract an operational feature; and
 comparing the operational feature to the reference model to determine whether the apparatus is operating in the normal mode of operational and when a decision criteria is met, then analyzing the captured signal in a second feature space that is different from the first feature space to determine whether there are additional features that define the normal operational mode.

14. The method of claim 13, wherein the decision criteria is whether a predetermined threshold amount of energy is accounted for in the second feature space.

15. The method of claim 13, further comprising adding the additional features to the reference model when it is determined that the additional features define the normal operational mode.

16. The method of claim 13, wherein the analysis of the signal in the second feature space is performed with principal component analysis, independent component analysis or mutual interdependence analysis.

17. A system comprising:
 apparatus that operates in a normal mode of operation;
 one or more sensors that capture signals while the apparatus is in an operating mode;
 memory that stores a reference model that defines a normal mode of operation in a first feature space; and
 a processor connected to the one or more sensors and to the memory that extracts an operational feature from capture signals and determines accesses the reference model to determine whether the apparatus is operating in the normal mode of operational and when a decision criteria is met, then analyzes the captured signals in a second feature space that is orthogonal to the first feature space to determine whether there are additional features that define the normal mode of operation.

18. The system of claim 17, wherein the decision criteria is whether a predetermined threshold amount of energy is accounted for in the second feature space.

19. The system of claim 17, wherein the processor adds the additional features to the reference model when it is determined that the additional features define the normal mode of operational.

20. The system of claim 17, wherein the processor performs the analysis of the signal in the second feature space with principal component analysis, independent component analysis or mutual interdependence analysis.

21. The system of claim 17, wherein features in the first feature space and the second feature space are selected from the group consisting of a maximum amplitude, an average amplitude, an energy content, an energy content in a selected frequency band, independent components, principal components, a crest factor, a deviation from an average, a kurtosis, and a skew all determined over a period of time in the transform domain.

* * * * *